June 27, 1967 H. WEINSTEIN 3,328,584
FIVE-LAYER LIGHT SWITCH
Filed Jan. 17, 1964
FIG. 1
PRIOR ART
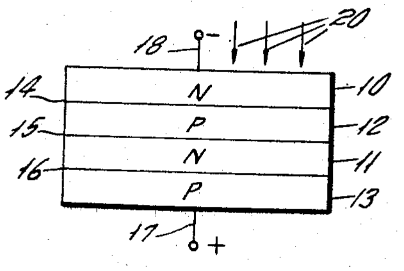
FIG. 3
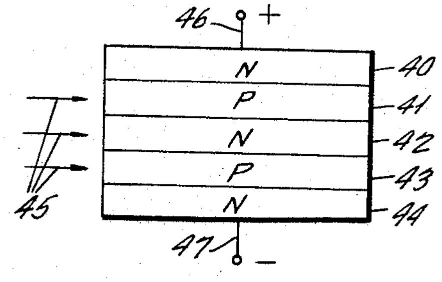
FIG. 6
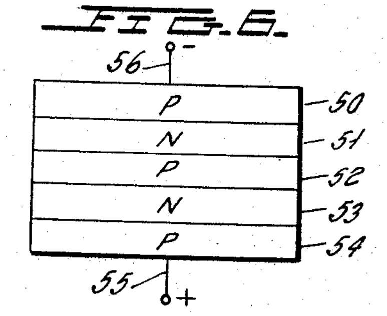
FIG. 4
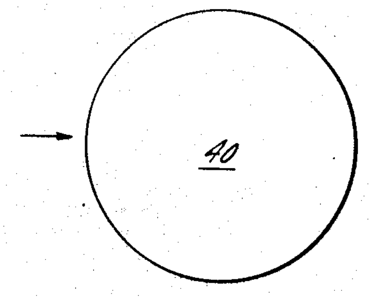
FIG. 2
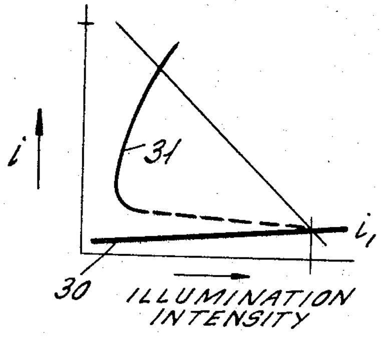
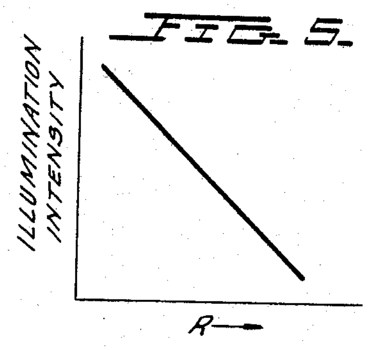
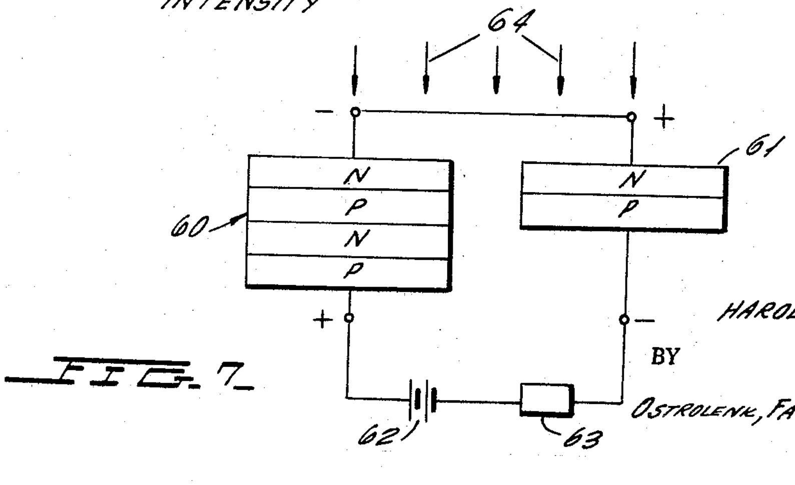
INVENTOR.
HAROLD WEINSTEIN
BY
OSTROLENK, FABER, GERB & SOFFEN
ATTORNEYS 3,328,584
FIVE-LAYER LIGHT SWITCH Harold Weinstein, Van Nuys, Calif., assignor to International Rectifier Corporation, El Segundo, Calif., a corporation of California Filed Jan. 17, 1964, Ser. No. 338,471
3 Claims. (Cl. 250—206)

This invention relates to a light-sensitive switch, and more specifically relates to a novel five-layer light-sensitive switch which is automatically turned off when illumination is removed therefrom.

Photo-sensitive switches are well known to the art which are formed of four-layer semiconductor devices. In these devices, when light of a suitable intensity impinges upon the light-sensitive device, it will be switched to a conductive condition. However, once these devices begin to conduct, they remain conductive even when the illumination is removed. Therefore, other circuitry must be provided to turn the devices off responsive to removal of illumination.

The principle of the present invention is to provide a novel combination of a four-layer switching device along with a photo-diode wherein the two receive the same illumination with the photo-diode causing the automatic turn-off of the device after the removal of illumination.

In one embodiment of the invention, this is accomplished by forming the photo-diode and four-layer switching device in a common five-layer body. Thus, the first two layers of the body can form the photo-diode, while the second through fifth layers form the four-layer structure. The common illumination will then control the resistance of the photo-diode in such a manner that in the presence of illumination its resistance will be negligible, while with the removal of illumination, its resistance is high enough to turn off the four-layer portion of the device.

Alternatively, it is possible to use two separate devices; a four-layer device and a photo-diode which have their own respective bodies, but could, for example, be contained in a common housing and connected in series with one another.

Accordingly, a primary object of this invention is to provide a novel photo-sensitive switch which is turned off responsive to the removal of illumination.

Another object of this invention is to provide a novel light switching device which permits rapid on-off action with D-C excitation.

Yet another object of this invention is to provide a novel light-sensitive switching device which is formed of a five-layer structure.

These and other objects will become apparent from the following description when taken in connection with the drawings, in which:

FIGURE 1 illustrates a prior art type four-layer photo-switch.

FIGURE 2 shows the operating characteristics of the photo-switch of FIGURE 1.

FIGURE 3 shows a first embodiment of the present invention for a five-layer device.

FIGURE 4 is a top view of the device of FIGURE 3.

FIGURE 5 shows the resistance characteristics of the photo-diode portion of the device of FIGURES 3 and 4.

FIGURE 6 shows an embodiment of the invention wherein light can come in through the upper surface of the device rather than along the edge thereof.

FIGURE 7 shows a still further embodiment of the invention wherein an independent four-layer device and an independent photo-diode are connected in series circuit relation with respect to one another and receive the same illumination.

Referring first to FIGURE 1, I have illustrated therein in exaggerated dimensional form a typical prior art type four-layer photo-switch. More specifically, the switch device of FIGURE 1 is formed of a suitable semiconductor body such as silicon which has four layers of alternate conductivity types. By way of example, in FIGURE 1, layers 10 and 11 are of N-type conductivity, while layers 12 and 13 are of P-type conductivity. Clearly, these layers define the three junctions 14, 15 and 16 and are formed in accordance with any of the presently well-known techniques. Two electrodes 17 and 18 are then connected to the opposite surfaces of the device in the usual manner to receive a positive bias voltage for electrode 17 with respect to electrode 18.

Illumination for operating the switch of FIGURE 1 comes from the direction shown by arrows 20, and operates in such a manner that the light penetrates through to layers 12 and 11 to cause electron-hole pairs which are within the diffusion length of the central junction 15. The junction 15 is normally a blocking junction which is forward biased by the voltages connected to terminals 17 and 18. This bias, however, is quite small compared to the blocking voltage of the junction. When, however, a sufficient number of photons enter the device, this junction becomes conductive so that a circuit can be completed through terminals 17 and 18.

The characteristics of this device are illustrated in FIGURE 2 where it is seen that as the illumination increase, the current gradually increases along line 30 until it reaches the point $i_1$ at which time avalanche occurs and current conduction begins along the line 31. It is to be particularly noted that even after illumination is substantially removed, the device will remain conductive. For this reason, it is necessary, when using devices of the type shown in FIGURE 1, to provide auxiliary circuitry for turning the devices to an off condition, particularly where D-C excitation is used.

The principle of the present invention is to form the light switch in the manner illustrated in FIGURE 3 of five layers 40 through 44 of alternate conductivity types. Thus, layers 40, 42 and 44 are of the N-type conductivity, while layers 41 and 43 are of P-type conductivity types. Clearly, the device of FIGURE 3 can be of circular shape, as indicated in FIGURE 4, or can be of any shape desired.

The device of FIGURES 3 and 4 is then so arranged that incident illumination comes in from the side, as indicated by arrows 45. The layers 41 through 44 of FIGURE 3 correspond to layers 13, 11, 12 and 10 respectively of FIGURE 1, and define the four-layer photo-switching portion of the structure. The layers 40 and 41, however, define a photo-diode whose resistance varies in accordance with incident illumination in the manner shown in FIGURE 5. These devices are, in effect, electrically connected in series, although they are all part of a preferably monocrystalline silicon structure. Suitable electrodes 46 and 47 are then connnected to the device, as shown in FIGURE 3.

In operation, a positive potential is connected to electrode 46 with respect to electrode 47. If now illumination is applied to the device, the resistance of the photo-diode section including layers 40 and 41 is decreased, while the illumination permits conduction of layers 41 through 44, as illustrated in FIGURE 2. If now the illumination is removed, the resistance of the photo-diode portion including layers 40 and 41 now increases to a magnitude sufficiently great to limit the current flow through the device to a value sufficiently low to permit extinction or a turning off of the four-layer portion of the switch.

Accordingly, the novel device of the invention permits rapid on and off action for the switch, and also permits the operation thereof within a D-C circuit.

While the embodiment of FIGURES 3 and 4 utilizes the incident light striking the edges of the device, the device can be arranged as illustrated in FIGURE 6 for receiving incident light on the upper surface thereof. Thus, in FIGURE 6, I have formed five layers 50 through 54 wherein the layers 50, 52 and 54 are of P-type conductivity, while layers 51 and 53 are of the N-type conductivity. The positive electrode 55 is then connected to the lower P-type region 54, while the upper negative electrode 56 is connected to the upper P-type region 50. Incident light is then applied to the upper surface 50 of the device.

The layers 50 through 53 of FIGURE 6 act as the four-layer switching portion, while the lower layers 53 and 54 act as the photo-diode portion of the switch, whereupon the layer thickness is suitably controlled so that photons can reach those layers in which hole-electrode pairs are to be generated.

Still another embodiment of the invention is shown in FIGURE 7 wherein a prior art type four-layer photo-switch 60 is electrically connected in series with a prior art type photo-diode 61. The series circuit further includes a suitable biasing source 62 and load 63 which could, for example, be a relay or the like, which is to be energized upon the occurence of some particular level of incident illumination and de-energized when this illumination disappears.

In accordance with the broad concept of the invention, the two devices 60 and 61 are suitable located adjacent one another in a common housing (not shown) in such a manner that each will see the same incident illumination, as indicated by the arrows 64. Thus, when the illumination occurs, the switch 60 is turned on, with the photo-diode 61 having a relatively low resistance. Once, however, this illumination is removed, the photo-diode 61 assumes a relatively high resistance so that the current flowing through the circuit will be below the cut-off value of current required for continued conduction of photo-switch 60.

Although this invention has been described with respect to its preferred embodiments, it should be understood that many variations and modifications will now be obvious to those skilled in the art, and it is preferred therefore that the scope of the invention be limited not by the specific disclosure herein but only by the appended claims.

The embodiments of the invention in which an exclusive privilege or property is claimed are defined as follows:

1. A light switching circuit comprising, in combination, a four-layer switch device, a two-layer photo-diode, a load circuit and a D-C voltage source; said four-layer switch device, said voltage source and said two-layer photo-diode being connected in series with one another; said four-layer switch device and said photo-diode being exposed to a common illumination source whereby a decrease in intensity of said illumination source causes an increase in resistance of said photo-diode; the output voltage of said D-C voltage source being lower than the voltage required to cause conduction of said four-layer switch device when the intensity of said light source is below a given value, said four-layer switch device having a predetermined holding current; said photo-diode having a resistance above some given value when said intensity of said light source is below its said given intensity value; the voltage of said D-C source divided by the sum of the resistance of said load circuit plus said given resistance value of said photo-diode being less than said predetermined holding current.

2. The combination substantially as set forth in claim 1 which includes a five-layer semiconductor wafer; said four-layer switch and said two-layer photo-diode being integral parts of said five-layer structure, said five-layer structure comprising a wafer of semiconductor material having five layers of alternate conductivity types; the first and second of said five layers forming said photo-diode; the said second through fifth layers forming said four-layer switch.

3. The combination substantially as set forth in claim 2 wherein incident light from said common illumination source is applied to the edge of said wafer.

References Cited

UNITED STATES PATENTS

| | | | |
|---|---|---|---|
| 2,944,165 | 7/1960 | Steutzer | 250—211 |
| 3,054,033 | 9/1962 | Iwama et al. | 307—88.5 |
| 3,096,442 | 7/1963 | Stewart | 250—211 |
| 3,160,828 | 12/1964 | Strull | 307—88.5 |
| 3,176,147 | 3/1965 | Miller | 307—88.5 |
| 3,187,204 | 6/1965 | Adkins | 250—206 X |
| 3,206,612 | 9/1965 | Swanekamp et al. | 307—88.5 |
| 3,209,154 | 9/1965 | Maring | 250—206 X |
| 3,247,388 | 4/1966 | Fischer et al. | 250—206 X |

RALPH G. NILSON, *Primary Examiner.*

M. A. LEAVITT, *Assistant Examiner.*